(12) United States Patent
Kaufman et al.

(10) Patent No.: US 7,598,209 B2
(45) Date of Patent: Oct. 6, 2009

(54) POROUS COMPOSITES CONTAINING HYDROCARBON-SOLUBLE WELL TREATMENT AGENTS AND METHODS FOR USING THE SAME

(75) Inventors: Philip B. Kaufman, Tomball, TX (US); Harold L. Becker, Tomball, TX (US)

(73) Assignee: BJ Services Company, Houston, TX (US)

( * ) Notice: Subject to any disclaimer, the term of this patent is extended or adjusted under 35 U.S.C. 154(b) by 302 days.

(21) Appl. No.: 11/340,052

(22) Filed: Jan. 26, 2006

(65) Prior Publication Data
US 2007/0173417 A1    Jul. 26, 2007

(51) Int. Cl.
*B01D 11/02* (2006.01)
*C09K 8/588* (2006.01)
*C09K 8/74* (2006.01)

(52) U.S. Cl. .................. 507/269; 507/220; 507/221; 166/304; 166/312; 166/279

(58) Field of Classification Search .................. 507/269
See application file for complete search history.

(56) References Cited

U.S. PATENT DOCUMENTS

| | | | |
|---|---|---|---|
| 1,570,537 A | | 1/1926 | Teitsworth |
| 3,179,170 A | | 4/1965 | Burtch et al. |
| 3,850,248 A | | 11/1974 | Carney |
| 4,108,779 A | | 8/1978 | Carney |
| 4,660,645 A | * | 4/1987 | Newlove et al. ............. 166/304 |
| 4,905,762 A | * | 3/1990 | Zilch ......................... 166/310 |
| 5,073,276 A | * | 12/1991 | Newlove et al. ............. 507/224 |
| 5,102,558 A | | 4/1992 | McDougall et al. |
| 5,187,011 A | | 2/1993 | Manalastas et al. |
| 5,224,543 A | | 7/1993 | Watkins et al. |
| 5,225,123 A | * | 7/1993 | Torobin ...................... 264/43 |
| 5,964,291 A | * | 10/1999 | Bourne et al. ............... 166/279 |
| 6,209,643 B1 | | 4/2001 | Nguyen et al. |
| 6,309,431 B1 | | 10/2001 | Becker et al. |
| 6,380,136 B1 | | 4/2002 | Bates et al. |
| 6,527,051 B1 | | 3/2003 | Reddy et al. |
| 6,736,867 B2 | | 5/2004 | Varadaraj |
| 2002/0128157 A1 | | 9/2002 | Bates et al. |
| 2003/0032562 A1 | | 2/2003 | Crossman et al. |
| 2004/0040708 A1 | | 3/2004 | Stephenson et al. |
| 2004/0043906 A1 | * | 3/2004 | Heath et al. ................. 507/200 |
| 2004/0110877 A1 | | 6/2004 | Becker |
| 2005/0028976 A1 | | 2/2005 | Nguyen |
| 2005/0034868 A1 | | 2/2005 | Frost et al. |
| 2006/0124301 A1 | | 6/2006 | Gupta |
| 2006/0124302 A1 | | 6/2006 | Gupta |

FOREIGN PATENT DOCUMENTS

| | | |
|---|---|---|
| GB | 2298440 A | 4/1996 |
| WO | 9936668 A1 | 7/1999 |
| WO | 9954592 A1 | 10/1999 |
| WO | 0011949 A1 | 3/2000 |
| WO | 200240827 A1 | 5/2002 |
| WO | 200517313 A1 | 2/2005 |

* cited by examiner

*Primary Examiner*—Timothy J. Kugel
*Assistant Examiner*—Atnaf Admasu
(74) *Attorney, Agent, or Firm*—Jones & Smith, LLP; John Wilson Jones

(57) ABSTRACT

Composites containing a hydrocarbon-soluble well treatment agent may be supplied to a well using a porous particulate. Such well treatment agents may for example inhibit the formation of paraffins, salts, gas hydrates, asphaltenes and/or other deleterious processes such as emulsification (both water-in-oil and oil-in-water). Further, other well treatment agents include foaming agents, oxygen scavengers, biocides and surfactants as well as other agents wherein slow release into the production well is desired.

17 Claims, 2 Drawing Sheets

Long term Permeability

Long term Conductivity

POROUS COMPOSITES CONTAINING HYDROCARBON-SOLUBLE WELL TREATMENT AGENTS AND METHODS FOR USING THE SAME

FIELD OF THE INVENTION

The invention relates to composites containing hydrocarbon-soluble well treatment agents which are incorporated into porous particulates. After being introduced into oilfield fluids, the well treatment agents of the composites are slowly released into the environs.

BACKGROUND OF THE INVENTION

Oilfield fluids (e.g., oil, gas, and water) are complex mixtures of aliphatic hydrocarbons, aromatics, hetero-atomic molecules, anionic and cationic salts, acids, sands, silts, clays and a vast array of other components. The nature of these fluids combined with the severe conditions of heat, pressure, and turbulence to which they are often subjected during retrieval, are contributory factors to paraffin deposition (including the precipitation of wax crystals), emulsification (both water-in-oil and oil-in-water), gas hydrate formation, corrosion and asphaltene precipitation in oil and/or gas production wells and surface equipment. This, in turn, decreases permeability of the subterranean formation, reduces well productivity and shortens the lifetime of production equipment. In order to rid such unwanted deposits and precipitates from wells and equipment, it is necessary to stop the production which is both time-consuming and costly For instance, paraffin hydrocarbon waxes which tend to precipitate and crystallize at low temperatures, cause oil to lose its fluidity. Over a range of temperatures, these paraffin wax crystals continue to aggregate and may even solidify the oil. This creates difficulties in transporting the petroleum fuel or crude oil through flow lines, valves, and pumps. Paraffin wax crystals are particularly problematic at lower temperatures and in colder climates where, as the temperature drops and approaches the crude oil's pour point, the transportation of crude oil becomes more difficult. Once out of solution, paraffin wax crystals often plug flow lines, production tubing, flow lines, screens and filters.

Various well treatment agents are often used in production wells to prevent the deleterious effects caused by such formations and precipitates. For instance, pour point depressants and wax crystal modifiers have been used to change the nature of wax crystals that precipitate from the petroleum fuel or crude oil, thereby reducing the tendency of wax crystals to set into a gel.

It is essential that such well treatment agents be placed into contact with the oilfield fluids contained in the formation before such fluids enter the wellbore where deleterious effects are commonly encountered. Several methods are known in the art for introducing such well treatment agents into production wells. A principal disadvantage of such prior art methods is the difficulty in releasing the well treatment agent into the well over a sustained period of time. As a result, treatments must repeatedly be undertaken to ensure that the requisite level of well treatment agent is continuously present in the well. Such treatments result in lost production revenue due to down time.

Treatment methods are therefore sought for introducing well treatment agents into oil and/or gas wells wherein the well treatment agent may be released over a sustained period of time. It is desired that such methods not require continuous attention of operators over prolonged periods.

SUMMARY OF THE INVENTION

The composites of the invention are composed of a porous particulate and at least one hydrocarbon-soluble well treatment agent. The composites have particular applicability in the treatment of a well penetrating a subterranean formation. In a preferred embodiment, the composites are employed as proppants. The composites may be added to a carrier or treatment fluid, where necessary, for pumping into the formation.

The porosity and permeability of the porous particulate is such that the hydrocarbon-soluble well treatment agent may be absorbed into the interstitial spaces of the porous particulate material. Typically, the porous particulate of the composite has a porosity no greater than 30%.

The porous particulate is preferably an untreated porous ceramic, inorganic oxide or an organic polymeric material. Suitable porous particulates include aluminosilicates, silicon carbide, alumina and other silica-based materials.

The hydrocarbon-soluble well treatment agent is preferably a demulsifier, corrosion inhibitor, paraffin inhibitor such as a wax crystal modifier, gas hydrate inhibitor, flocculating agent, asphaltene dispersant or a combination thereof.

Preferred as hydrocarbon-soluble well treatment agents are polymeric wax crystal modifiers, such as those selected from ethylene/vinyl acetate copolymers, homopolymers and copolymers of acrylate esters, phenol-aldehyde resins and olefin/maleic esters copolymers.

The composites have particular applicability in the treatment of a well penetrating a subterranean formation since the hydrocarbon-soluble well treatment agent is slowly leached out into the well fluid over a period of time.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
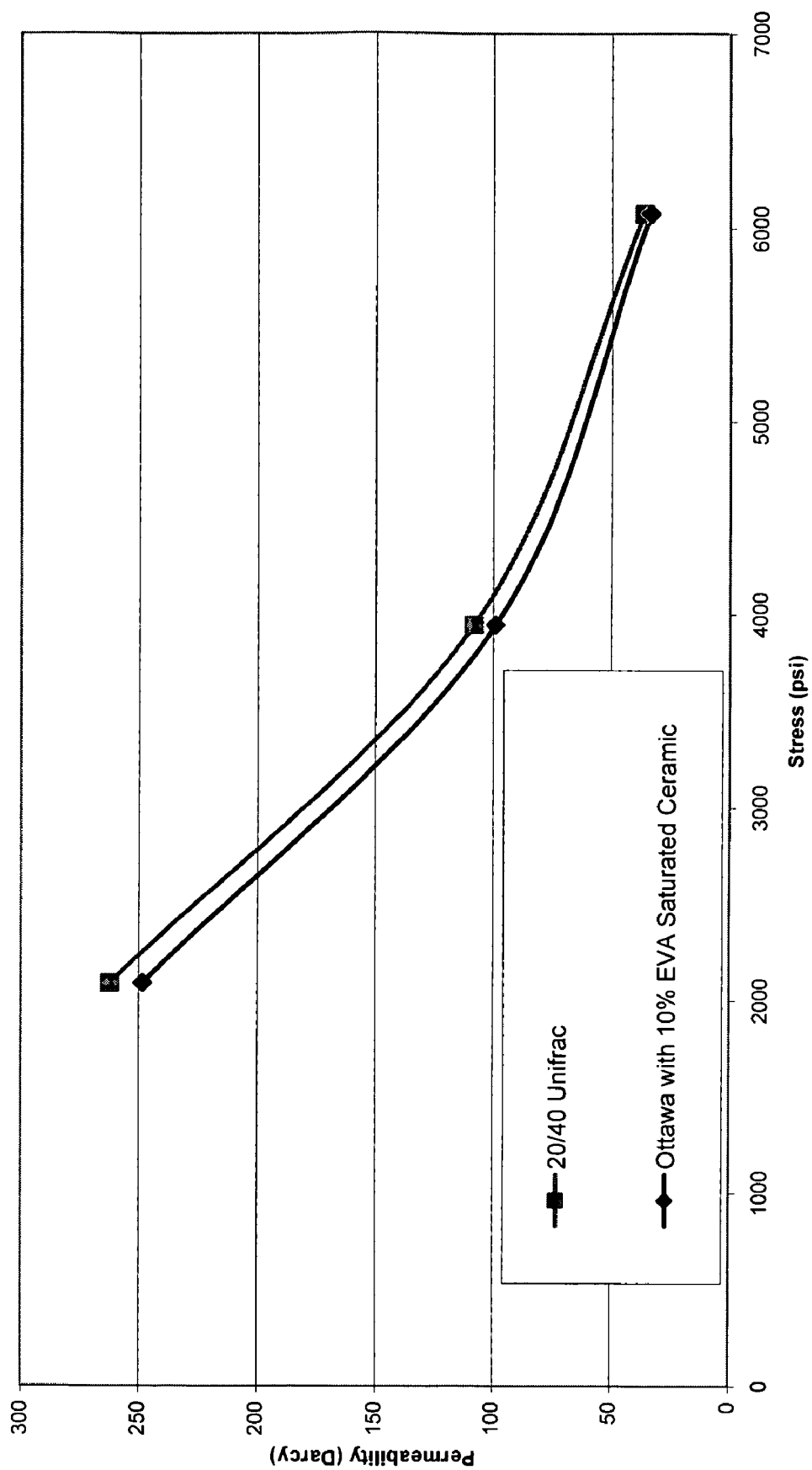
FIG. 1 illustrates the permeability of the porous impregnated composites of the invention versus 20/40 Ottawa sand.

The composites of the invention are capable of providing a means of slowly releasing a hydrocarbon-soluble well treatment agent into a subterranean formation. The composites of the invention are composed of a porous particulate and at least one hydrocarbon-soluble well treatment agent. Typically, the particle size of the porous particulate is typically between from about 0.3 mm to about 5 mm, preferably between from about 0.4 to about 2 mm.

The porosity and permeability of the porous particulate is such that the hydrocarbon-soluble well treatment agent may be absorbed into the pores of the porous particulate material. Typically, the porosity of the porous particulate is between from about 5 to about 30 volume percent. A commercially available instrument which uses mercury intrusion, such as the AutoPore Mercury Porosimeter (Micromeritics, Norcross, GA), for measuring the internal porosity of the particulate and the interstitial volume (of a pack) may be used to determine the porosity of the porous particulate. Examples of types of materials suitable for use as porous particulates include particulates having a porous matrix.

The porous particulates are generally spherical and insoluble in well fluids under subterranean conditions, such as at temperatures less than about 250° C. and pressures less than about 80 MPa. The particulates may be sufficiently strong to be used on their own at high pressures. They may further be used in conjunction with other well treatment agents including non-porous proppant materials, such as sand.

The porous particulate of the composite may be any naturally occurring or manufactured or engineered porous ceramic particulate, as well as any organic polymeric material, that has an inherent and/or induced porosity and exhibits the requisite physical properties, such as particle characteristics, desired strength and/or apparent density, to fit particular downhole conditions for well treating.

For example, when used in hydraulic fracturing and/or sand control treatments, the porous particulate may be selected so to exhibit crush resistance under conditions as high as 10,000 psi closure stress, API RP 56 or API RP 60, generally between from about 250 to about 8,000 psi closure stress.

The porous ceramic particulates may be selectively manufactured from raw materials such as those described in U.S. Pat. Nos. 5,188,175; 4,427,068; and 4,522,731, which are each incorporated herein by reference, such as by inclusion of selected process steps in the initial material manufacturing process to result in a material that possesses desired characteristics of porosity, permeability, apparent density or apparent specific gravity (ASG) and combinations thereof.

Suitable as inorganic ceramic materials are alumina, magnetic glass, titanium oxide, zirconium oxide, silicon carbide, aluminosilicates and other silica-based materials.

Examples of non-natural porous particulate materials for use in the invention include, but are not limited to, porous ceramic particles, such as fired kaolinitic particles, as well as partially sintered bauxite. The porous particulates may further be porous natural ceramic materials, such as lightweight volcanic rocks, like pumice, as well as perlite and other porous "lavas" like porous (vesicular) Hawaiian Basalt, porous Virginia Diabase and Utah Rhyolite. Such naturally occurring materials may be strengthened or hardened by use of modifying agents to increase the ability of the naturally occurring material to resist deformation. A starch binder may be employed.

Further, suitable as porous particulates are those particulates set forth in U.S. Pat. No. 5,964,291.

Suitable polymeric materials for use as the porous particulate include thermosetting resins, such as polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin.

The composites of the invention may be employed with carrier or treatment fluids in order to facilitate placement of the composite to a desired location within the formation. The fluids may be gelled or non-gelled. In one embodiment, the porous composites may be introduced or pumped into a well as neutrally buoyant particles in, for example, a saturated sodium chloride solution carrier fluid or a carrier fluid that is any other completion or workover brine known in the art.

In a preferred embodiment, the porous particulate material is a relatively lightweight or substantially neutral buoyant particulate material. The term "relatively lightweight" shall refer to a particulate that has an ASG (API RP 56) that is substantially less than a conventional particulate material employed in hydraulic fracturing or sand control operations, e.g., sand (having an ASG, API RP 60, of 2.65) or bauxite (having an ASG of 3.55). The ASG of a relatively lightweight material is preferably less than about 2.4, more preferably less than or equal to 2.0, even more preferably less than or equal to 1.75, most preferably less than or equal to 1.25.

Further, blends of the referenced materials may be used for achieving desired well treatment results and/or costs. Blends may consist of the referenced porous particulates as well as particulates not included within the porous particulates of the invention. Particle types which may be selected for use in such blends include such non-porous particulates like conventional sand, such as Ottawa sand.

Such different types of particulates may be selected, for example, to achieve a blend of different specific gravities or densities relative to the selected carrier fluid. For example, a blend of three different particles may be selected for use in a water fracture treatment to form a blend of well treatment particulates having three different specific gravities, such as an ASG of the first type of particle from about 1 to less about 1.5; an ASG of the second type of particle from greater than about 1.5 to about 2.0; and ASG of the third type of particle from about greater than about 2.0 to about 3.0; or in one specific embodiment the three types of particles having respective specific gravities of about 2.65, about 1.7 and about 1.2. In one example, at least one of the types of selected well treatment particulates may be selected to be substantially neutrally buoyant in the selected carrier or treatment fluid.

Since the well treatment agents employed in the composites are capable of being absorbed into the interstitial spaces of the porous particulates, the well treatment agents may be slowly released from the composite upon introduction into a targeted area. The composite of the invention therefore permits a continuous supply of the well treatment agent into the targeted area.

The hydrocarbon-soluble well treatment agent is preferably a demulsifier, corrosion inhibitor, paraffin inhibitor, gas hydrate inhibitor, flocculating agent, asphaltene dispersant or a wax crystal modifier or a combination thereof.

Polymeric wax crystal modifiers useful in the present invention generally include acrylates and methacrylates with pendant groups of $C_{16}$ to $C_{50}$, as well as polymers with long repeating saturated carbon chain segments such as ethylene vinyl acetate copolymers. These include but are not limited to acrylate or methacrylate esters of long chain alcohols, long chain alcohol esters of maleic acid, long chain fatty acid esters of acrylate and methacrylate polymers, maleic olefin alkyl esters, and ethylene vinyl acetate polymers of varying molecular weights. Further, wax crystal modifiers may include those having oil-soluble polar compounds containing ionic or polar groups, for example amine salts and/or amides, which can be obtained by reaction of aliphatic or aromatic amines, preferably long-chain aliphatic amines, with aliphatic or aromatic mono-, di-, tri-or tetracarboxylic acids or anhydrides thereof. Copolymers, terpolymers and tetrapolymers are also contemplated.

Other wax crystal modifiers include copolymers of maleic anhydride and alpha, beta-unsaturated compounds, which can, if desired, be reacted with primary monoalkylamines and/or aliphatic alcohols, the products of the reaction of alkenylspirobislactones with amines and products of the reaction of terpolymers based on alpha, beta-unsaturated dicarboxylic anhydrides, alpha, beta-unsaturated compounds and polyoxyalkylene ethers of lower unsaturated alcohols. Alkylphenol-formaldehyde resins are also suitable as paraffin dispersants Preferred wax crystal modifiers include ethylene vinyl acetate copolymers, maleic olefin alkyl esters, acrylate esters, methacrylic esters, and mixtures thereof including homopolymers and copolymers of $C_6$-$C_{24}$ linear esters of acrylic and methacylic acids and $C_{20}$ alpha olefin-maleic copolymers esters of $C_{16}$-$C_{24}$ linear alcohols and $C_{16}$-$C_{28}$ para-substituted phenol formaldehyde resins.

Preferred are polymeric wax crystal modifiers such as those selected from ethylene/vinyl acetate copolymers, homopolymers and copolymers of acrylate esters, phenol-aldehyde resins and olefin/maleic esters copolymers.

The oil-soluble well treatment agents of the composites are slowly released into production fluids. For instance, formation of wax crystal precipitates that often impede the flow and transportation of crude oil through tubing, flow lines and pumps is disrupted by the slow release of polymeric wax crystal modifiers in the composite. The composites are therefore effective in retarding the formation of paraffin crystal precipitates, while remaining fluid over a range of temperatures from –40° C. to 70° C. The composites are further effective at winterizing or freeze protecting wax crystal modifiers.

Exemplary of the demulsifying agents that are useful include, but are not limited to, oxyalkylated polyols, oxyalkylated phenol-formaldehyde condensation products, oxyalkylated polyamines, alkyl benzene sulfonates, polyethylene oxides, polypropylene oxides, block copolymers of ethylene oxide and propylene oxide, amine glycol condensates, and salts and esters of oil soluble acids.

For example, use can be made of oxyalkylated trimethylol alkanes with molecular weights in the range of 1,000 to 10,000, and preferably in the range of 3,000 to 8,000. Preferably, the oxyalkylated trimethylol alkane is an oxyalkylated trimethylol ethane or propane, especially where the oxyalkylene groups are composed of a mixture of propyleneoxy and ethylenoxy groups and where these groups are so disposed as to form relatively hydrophobic blocks adjacent the trimethylol group and relatively hydrophilic blocks remote the trimethylol group.

Another type of suitable demulsifiers is oxyalkylated alkyl phenol-formaldehyde condensation products. Typically, these products have molecular weights in the range of about 4,000 to about 6,000 and are comprised of lower alkyl substituted phenol moieties joined together by methylene groups and in which the hydroxyl groups of the phenolic moieties have been ethoxylated. Such products may be supplied as a concentrate in an aromatic solvent.

Another suitable type of demulsifier is comprised of the tetra-polyoxyalkylene derivatives of ethylene diamine, especially the tetra-poly(oxyethylene)-poly(oxyethylene) derivatives of ethylene diamine. Mixtures of alkylaryl sulfonates, polyoxyalkylene glycols and oxyalkylated alkylphenolic resins are also suitable. Also useful as demulsifiers are block copolymers of propylene oxide and ethylene oxide. Suitable amine glycol condensates are available under the TRITON trademark of Rohm & Haas Company.

Exemplary corrosion inhibitors useful for the practice of the invention include thiazoles, triazoles and thiadiazoles. Examples of such compounds include benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles.

Other types of corrosion inhibitors suitable for use in the compositions of this invention include dimer and trimer acids, such as are produced from tall oil fatty acids, oleic acid and linoleic acid. Another useful type of corrosion inhibitor for use in the practice of this invention are the alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid and hexadecenylsuccinic anhydride. Also useful are the half esters of alkenyl succinic acids having 8 to 24 carbon atoms in the alkenyl group with alcohols such as the polyglycols. Other suitable corrosion inhibitors include aminosuccinic acid derivatives; ether amines; acid phosphates; amines; polyethoxylated compounds such as ethoxylated amines, ethoxylated phenols, and ethoxylated alcohols; imidazolines.

Gas hydrate treating chemicals or inhibitors that are useful for the practice of the present invention include but are not limited to oil-soluble esters of alkoxylated hydroxycarboxamides known in the art.

Exemplary asphaltene treating chemicals include but are not limited to, basic iron salts of organic acids, mixtures of iron hydroxide and a basic calcium soap, basic and oil-soluble magnesium salts of sulfonic acids, succinimides, optionally in combination with oil-soluble carbonyl manganese compounds and/or a neutral or basic alkali metal salt or alkaline earth metal salt of an organic acid component, as well as alkoxylated fatty amines and fatty amine derivatives, optionally in combination with an organic metal salt.

Exemplary surfactants include cationic, amphoteric, anionic and nonionic surfactants including ethoxylated alkyl amines, ethoxylated alkyl diamines, ethoxylated alkyl amides and mixtures thereof, such as those represented by the formula:

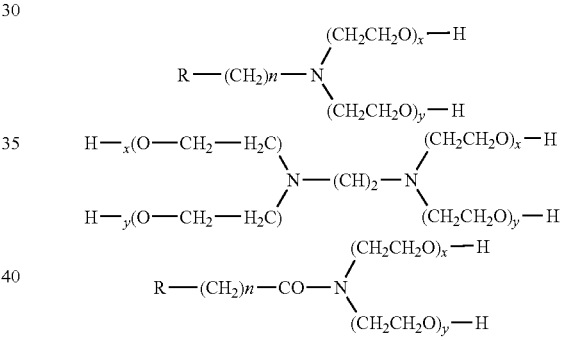

where R is a methyl group, n is an integer 2 to 25, x and y are integers and x+y is from 2 to 50.

Further, suitable surfactants include alkoxylated alkyl alcohols, alkoxylated alkyl mono esters, alkoxylated alkyl diesters and mixtures thereof, such as those represented by the respective formula R—$(CH_2)_p$—O-(M-O)$_m$—H; R—$(CH_2)_p$—CO—O-(M-O)$_m$—H; and R—$(CH_2)_p$—CO—O-(M-O)$_m$—CO—$(CH_2)_p$—R where R is a methyl group, p is an integer from about 5 to 17, m is an integer from about 2 to 50, M is $CH_2$—$CH_2$, $CH_2$—$CH_2$—$CH_2$, $CH_2$—CH—$CH_3$, $CH_2$—$CH_2$—$CH_2$—$CH_2$, $CH_2$—CH—$(CH_3)$—$CH_2$ or mixtures thereof.

The term "alkyl" in the ethoxylated alkyl amine, ethoxylated alkyl diamine, ethoxylated alkyl amide, alkyl alcohols, alkoxylated alkyl monoesters and alkoxylated alkyl diesters are meant to represent saturated alkyl hydrocarbons, unsaturated alkyl hydrocarbons or mixtures thereof.

The well treatment agent is preferably a liquid material. If the well treatment agent is a solid, it can be dissolved in a suitable solvent, thus making it a liquid. The composites may be prepared by conventional processes, such as electrofusion, spray-drying and pelletization. In a preferred embodiment, the composites are prepared by placement of the porous particulate into a dilute solution or suspension of the well treatment agent and permitting the porous particulate to imbibe the well treatment agent.

For instance, suitable wax crystal modifiers may be added to and dissolved in a bipolar solvent or solvent mixture at elevated temperatures, typically ranging from about 65° C. to about 175° C. and then cooled (typically at ambient temperature) with mixing to form a suspension of finely divided wax crystal modifier polymer particles. Alternatively, an organic solvent (or solvents) may also be added (typically during the cooling phase) to help develop the polymeric suspension. Alternatively, the organic solvent may be added to the polymer/solvent mixture before or during the heating phase. Surfactants and suspending agents may also be added. The porous particulate is then added to the suspension and the mixture stirred at a temperature where the hydrocarbon-soluble well treatment agent remains liquid, typically until saturation or until maximum absorption of the porous particulate is attained. Mixing may further be conducted under vacuum especially where it is desired to remove air in the porous particulate. Vacuum is typically conducted at or below room temperature.

Solvents that may be used to develop the polymeric suspension include but are not limited to diethylene glycol, butanol, isobutanol, 2-ethyl hexanol, butyl carbitol and butyl cellosolve. Diethylene glycol is the most preferred solvent for use with a polymer/bipolar solvent mixture comprising ethylene vinyl acetate copolymers solvated in ethoxylated monohydric alcohols. However, selection of the appropriate solvent will depend largely on the type of hydrocarbon-soluble well treatment agent within the composite, as well as the range of solubility parameters, hydrogen bonded characteristics, and densities that are necessary for the formation of highly dispersed and finely divided polymer particles.

Alternatively, the polymeric wax crystal modifiers may be first solvated in a nonpolar aliphatic solvent or solvent mixture (such as kerosene and petroleum hydrocarbon distillate) or other low aromatic paraffinic solvents and then mixed and heated to form a solution. Generally, the polymer/aliphatic solvent mixture are heated to a temperature above the melting point of the polymers. The solvent is then extracted by the addition of a bipolar solvent such as isopropyl alcohol with vigorous mixing to disperse the polymer particles.

Useful bipolar solvents include alcohols, ethoxylated alcohols, glycol ether esters, alkanes and turpenes. Preferred bipolar solvents include $C_3$-$C_{16}$ alcohols and/or ethoxylated alcohols possessing up to six ethylene oxide residues, $C_2$-$C_{10}$ esters of mono-, di-, and tri-glycol ethers, $C_8$-$C_{16}$ alkanes, and turpenes (e.g., turpentine, dipentene, and alpha-pinene). More preferred bipolar solvents include ethoxylated monohydric alcohols such as ALFONIC 6-3 ($C_6$ normal monohydric alcohol condensed with 3 moles of ethylene oxide, commercially available from Vista Chemical Company) and ALFONIC 810-2 ($C_8$-$C_{10}$ mixed normal monohydric alcohol condensed with 2 moles of ethylene oxide, commercially available from Vista Chemical Company), 2-ethyl hexanol, methanol, ethanol, butanol, isobutanol, isopropyl alcohol, and mixtures thereof.

In general, 2 to 30% weight wax crystal modifier is dissolved in 5 to 55% weight bipolar solvent. In a preferred embodiment, 10 to 25% weight wax crystal modifier is dissolved in 35 to 50% weight bipolar solvent. In a more preferred embodiment, 15 to 25% weight wax crystal modifier is dissolved in 40 to 50% weight bipolar solvent. Once the wax crystal modifier has been dissolved in the bipolar solvent at elevated temperatures, the polymer/solvent mixture is allowed to cool to ambient temperature with vigorous mixing.

When an organic solvent is used, typically 5 to 50% weight solvent is added. In a preferred embodiment, 25 to 45% weight solvent is added, and in a more preferred embodiment, 30 to 45% weight solvent is added. Alternatively, a higher percentage weight bipolar solvent or combination of solvents may be used in place of the solvent. In certain embodiments, aromatic solvents such as xylene and toluene may also be used. Surfactants such as sorbitan monooleate, sorbitan monopalmitate, and sodium xylene sulfonate may be added to the bipolar or polar solvent to help disperse the wax crystal modifier particles. Suspending agents or viscosifiers may also be used. A preferred viscosifier is polyvinyl pyrrolidone.

Disruption of the wax crystal modifiers change the morphology of the paraffin crystals that are already present in the petroleum fuel or crude oil and retard further crystal growth, altering the crystallization point of the petroleum fuel or crude oil that is being treated.

The composites of the invention do not require excessive amounts of well treatment agents. The amount of well treatment agent in the composite is that amount sufficient to effectuate the desired result over a sustained period of time. Generally, the amount of well treatment agent in the composite is from about 0.05 to about 5 (preferably from about 0.1 to about 2) weight percent based upon the total weight of the composite.

The weight ratio of well treatment agent to water-insoluble absorbent is generally between from about 90:10 to about 10:90.

The composite is typically introduced into the formation as a component of a well treating composition which further contains a carrier or treatment fluid. Any carrier fluid suitable for transporting the particulate into a well and/or subterranean formation fracture in communication therewith may be employed including carrier fluids including a completion or workover brine. The carrier fluid may be salt water, fresh water, a brine such as a saturated potassium chloride or sodium chloride solution, liquid hydrocarbons, or a gas such as nitrogen or carbon dioxide.

The porous particulates are typically selected based on porosity and/or permeability characteristics so that they have desired lightweight characteristics, such as when suspended in a selected carrier fluid for a well treatment. The inherent and/or induced porosity of a porous material particle may be selected so as to help provide the desired balance between apparent density and strength.

As the oilfield fluid passes through or circulates around the composites of the invention, the well treatment agent slowly dissolves. In so doing, the composites are characterized by time-release capabilities. Gradual dissolution of the well treatment agents insures that they are available to the oilfield fluids for extended periods of time, typically extending for periods of time greater than a year and even as long as five years. Typically the resulting concentration of the well treatment agent in the well or wellbore is between from about 1 to about 50 ppm. The amount of well treatment agent in the well treating composite may be as low as 1 ppm.

The well treating composition of the invention may be used in stimulation treatments as a component of a fracturing fluid or acidizing fluid, such as a matrix acidizing fluid. The composite has particular applicability in completion fluids containing zinc bromide, calcium bromide calcium chloride and sodium bromide brines. Such fluids may be introduced down the annulus of the well and, when desired, flushed with produced water.

Other treatments may be near wellbore in nature (affecting near wellbore regions) and may be directed toward improving wellbore productivity and/or controlling the production of fracture proppant or formation sand. Particular examples include gravel packing and "frac-packs." Moreover, such particles may be employed alone as a fracture proppant/sand control particulate, or in mixtures in amounts and with types of fracture proppant/sand control materials, such as conventional fracture or sand control particulates.

The composites of the invention are particularly effective in hydraulic fracturing as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

For instance, the composite may be mixed and pumped during any desired portion(s) of a well treatment such as hydraulic fracturing treatment or sand control treatment and may be mixed in any desired concentration with a carrier fluid. In this regard, any carrier fluid suitable for transporting the composite may be used. Suitable carrier fluids include or may be used in combination with fluids have gelling agents, cross-linking agents, gel breakers, surfactants, foaming agents, demulsifiers, buffers, clay stabilizers, acids, or mixtures thereof.

When used in hydraulic fracturing, the composite may be injected into a subterranean formation in conjunction with a hydraulic fracturing fluid at pressures sufficiently high enough to cause the formation or enlargement of fractures. Since the particulates may withstand temperatures greater than about 370° C. and closure stresses greater than about 8000 psi, they may be employed as the proppant particulate. Alternatively, the composite may be employed in conjunction with a conventional proppant. Since the porous particulate of the composite is insoluble, the composite may continue to function as a proppant even after the well treatment agent has been completely leached out of the composite.

The aforementioned blends may be employed in to optimize hydraulic fracture geometries to achieve enhanced well productivity, such as to achieve increased propped fracture length in relatively "tight" gas formations. Choice of different particulate materials and amounts thereof to employ in such blends may be made based on one or more well treatment considerations including, but not limited to, objective/s of well treatment, such as for sand control and/or for creation of propped fractures, well treatment fluid characteristics, such as apparent specific gravity and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and/or sand control pack conductivity and combinations thereof. The fracturing fluid, to be used with the composite, exhibits high viscosity, so as to be capable of carrying effective volumes of one or more proppants. It may include aqueous gels and hydrocarbon gels.

The composite may further be advantageously employed in liquefied gas and foamed gas carrier fluids, such as liquid $CO_2$, $CO_2/N_2$, and foamed $N_2$ in $CO_2$ based systems. In this regard, liquid $CO_2$ based fracturing job characteristics, such as proppant amounts, proppant sizes, mixing and pumping methodologies, using relatively lightweight porous ceramic materials may be the same as employed for conventional proppants.

Further, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the composite and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the composite; the balance of the slurry may be another material, such as a conventional gravel pack particulate.

As an alternative to use of a screen, the composite may be used in any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The following examples illustrate the invention in its preferred embodiments. Other embodiments within the scope of the claims herein will be apparent to one skilled in the art from consideration of the specification and practice of the invention as disclosed herein. It is intended that the specification, together with the examples, be considered exemplary only.

EXAMPLES

Example 1

Porous ceramic beads impregnated with ethylene vinyl acetate copolymer were prepared by placing spherical insoluble beads of aluminosilicate having a porosity of approximately 12 volume percent and having 20/40 mesh into a 10 weight percent solution of ethylene vinyl acetate copolymer in xylene blend. The beads were allowed to soak up the ethylene vinyl acetate. The beads were then placed onto a wire mesh drying bed and the liquid was then passed through the wire mesh and recovered for reuse. After removal of the excess copolymer, the ceramic particles were then dried in an oven at a temperature of about 100° C. The particles were then passed through a wire sieve of about 16 mesh.

The impregnated porous beads were then added to Ottawa sand rendering a 90 weight percent Ottawa sand admixture which was then introduced into a column. The column was then saturated with sea water brine.

An oil having a 4.4° C. pour point, ASTM D-97, was then placed on top of the column and was allowed to flow over the admixture. Twenty aliquots of 10 ml were periodically obtained and the pour point determined, ASTM D-97, to be −40° C. No decline in effectiveness was observed after an additional five aliquots retrieved, the pour point being measured at −40° C.

Example 2

Using approximately 63 grams of proppant having a proppant width pack of 0.231 inches, conductivity tests were performed according to API RP 61 (1st Revision, Oct. 1, 1989) but using an API conductivity cell with Ohio sandstone wafer side inserts to simulate the producing formation. The test proppant was placed between the sealed sandstone wafers. The test proppant was a 20/40 Ottawa sand, commercially available as 20/40 Unifrac from Unimin Corporation and the porous impregnated composites of Example 1.

The conductivity cell was then placed on a press while stress was applied at 100 psi/minute until the target temperature was reached. Fluid was then allowed to flow through the test pack maintaining Darcy flow. The differential pressure was measured across 5 inches of the pack using a "ROSEMOUNT" differential pressure transducer (#3051C). Flow was measured using Micromotion mass flow meters and data points were recorded every 2 minutes for 50 hours. An Isco 260D programmable pump applied and maintained effective closure pressure.

Experimental parameters for the conductivity evaluation are shown in Table I and the results show in Table II below:

TABLE I

| Fluid | Deionized Water |
|---|---|
| Particulate (grams) | 31.5 |
| Top Core Width (mm) | 10.970 |
| Bot Core (mm) | 9.680 |
| Width Pack, initial (cm) | 0.231 |
| Closure Pressure (psi) | 2000-6000 |
| Fluid Pressure (psi) | 500 |
| Concentration (lbs/ft$^2$) | 2 |
| Temperature | 65° C. |

TABLE II

| | Long term Conductivity: Ohio Sandstone, 65° C., 2#/ft2 loading | | | |
|---|---|---|---|---|
| | 20/40 Ottawa Sand with 10% EVA Saturated Ceramic | | 20/40 Ottawa Sand | |
| Closure Kpsi | Conductivity md-ft | Permeability Darcies | Conductivity md-ft | Permeability darcies |
| 2 | 4450 | 248 | 4818 | 262 |
| 4 | 1535 | 99 | 1930 | 108 |
| 6 | 466 | 33 | 614 | 36 |

Figure 2:
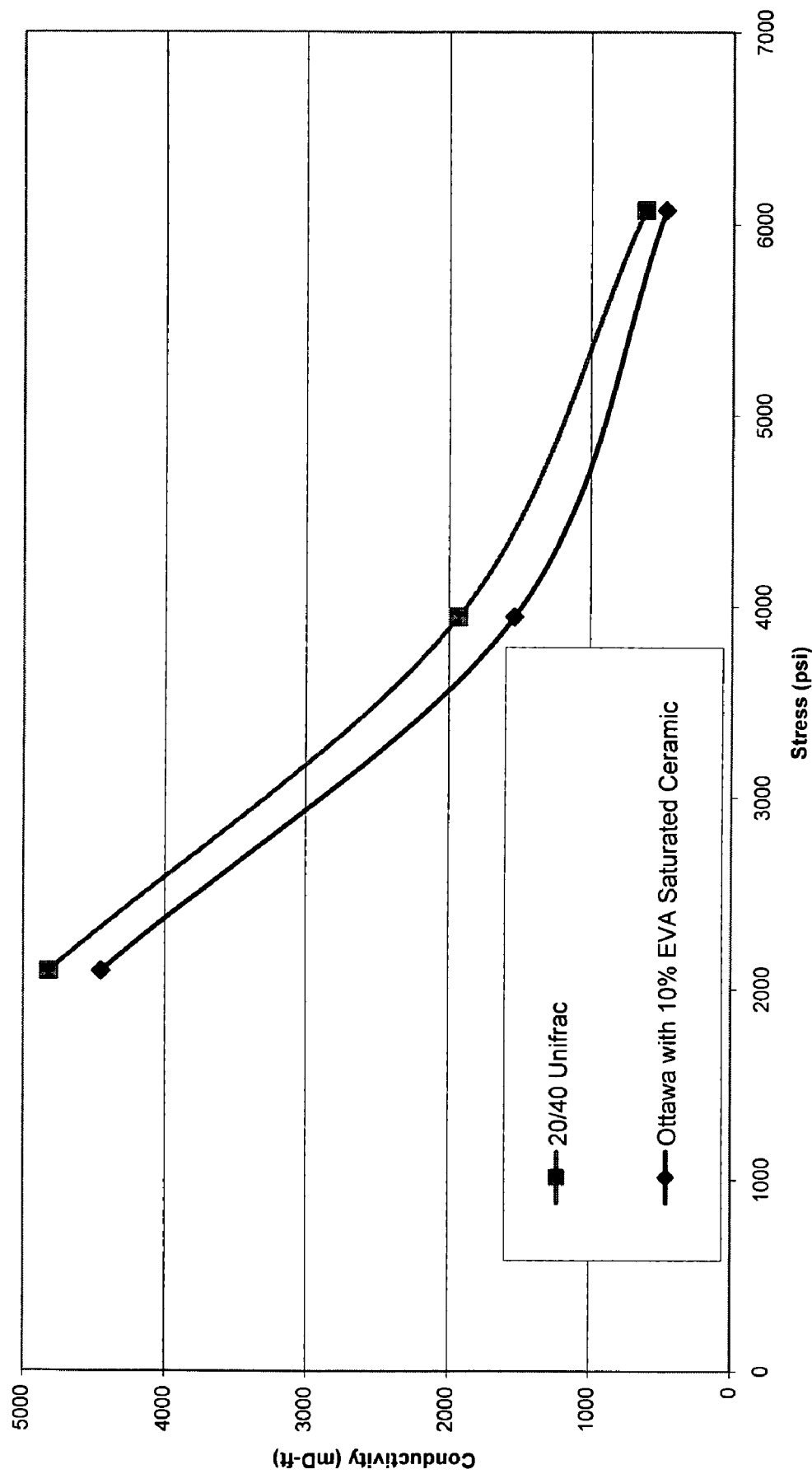
FIG. 2 illustrates the conductivity of the porous impregnated composites of the invention versus 20/40 Ottawa sand.

FIG. 1 and FIG. 2 graphically display the permeability and conductivity data, respectively for the 20/40 Ottawa sand versus 90% Ottawa sand with 10% porous impregnated composites of the invention. As illustrated, conductivity is not adversely affected by the addition of 10 percent by volume of the composites of the invention.

From the foregoing, it will be observed that numerous variations and modifications may be effected without departing from the true spirit and scope of the novel concepts of the invention.

What is claimed is:

1. A composite comprising a porous particulate and a hydrocarbon-soluble well treatment agent wherein the porosity and permeability of the porous particulate is such that the hydrocarbon-soluble well treatment agent is absorbed into the interstitial spaces of the porous particulate material and further wherein the composite is prepared by the addition of the well treatment agent in an organic solvent to the porous particulate and the porous particulate is an aluminosilicate, silicon carbide, alumina or silica-based material.

2. The composite of claim 1, wherein the hydrocarbon-soluble well treatment agent is a polymeric wax crystal modifier.

3. The composite of claim 2, wherein the polymeric wax crystal modifier is selected from the group consisting of ethylene/vinyl acetate copolymers, homopolymers and copolymers of acrylate esters, phenol-aldehyde resins and olefin/maleic esters copolymers.

4. The composite of claim 2, wherein the hydrocarbon-soluble well treatment agent further comprises at least one member selected from the group consisting of demulsifiers, corrosion inhibitors, paraffin inhibitors, gas hydrate inhibitors, flocculating agents and asphaltene dispersants.

5. The composite of claim 1, wherein the porous particulate has a porosity of no greater than 30%.

6. The composite of claim 1, wherein the porous particulate is an aluminosilicate.

7. The composite of claim 1, wherein the porous particulate is a proppant.

8. A composite comprising a porous proppant and a hydrocarbon-soluble oilfield chemical well treatment agent, the porosity of the porous particulate being no greater than 30% and sufficient to at least partially absorb into its interstitial spaces the hydrocarbon-soluble oilfield chemical well treatment agent.

9. The composite of claim 8, wherein the porous proppant is selected from the group consisting of porous ceramics, inorganic oxides and organic polymeric materials.

10. The composite of claim 8, wherein the hydrocarbon-soluble oilfield chemical well treatment agent is a polymeric wax crystal modifier.

11. The composite of claim 10, wherein the polymeric wax crystal modifier is selected from the group consisting of ethylene/vinyl acetate copolymers, homopolymers and copolymers of acrylate esters, phenol-aldehyde resins and olefin/maleic esters copolymers.

12. The composite of claim 8, wherein the hydrocarbon-soluble oilfield chemical well treatment agent comprises at least one member selected from the group consisting of demulsifiers, corrosion inhibitors, paraffin inhibitors, gas hydrate inhibitors, flocculating agents and asphaltene dispersants.

13. A method for treating a well penetrating a subterranean formation, comprising introducing into the well the composite of claim 1, wherein the hydrocarbon-soluble well treatment agent is leached out into the well fluid over a period of time.

14. The method of claim 13, wherein the hydrocarbon-soluble well treatment agent comprises at least member selected from the group consisting of demulsifiers, corrosion inhibitors, paraffin inhibitors, gas hydrate inhibitors, flocculating agents and asphaltene dispersants.

15. The method of claim 13, wherein the hydrocarbon-soluble well treatment agent is a polymeric wax crystal modifier.

16. The method of claim 15, wherein the polymeric wax crystal modifier is selected from the group consisting of ethylene/vinyl acetate copolymers, homopolymers and copolymers of acrylate esters, phenol-aldehyde resins and olefin/maleic esters copolymers.

17. The method of claim 13, wherein the porous particulate has a porosity of no greater than 30%.

* * * * *